Patented May 27, 1924.

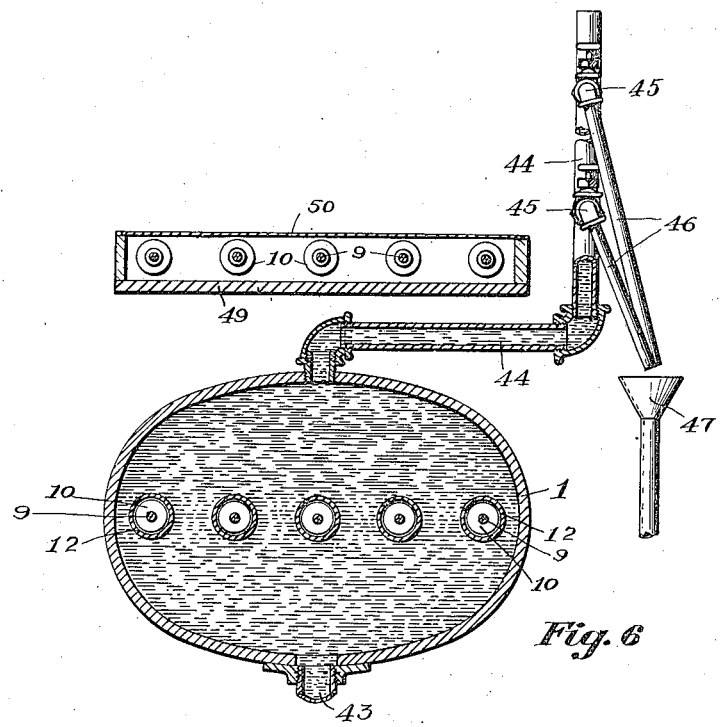
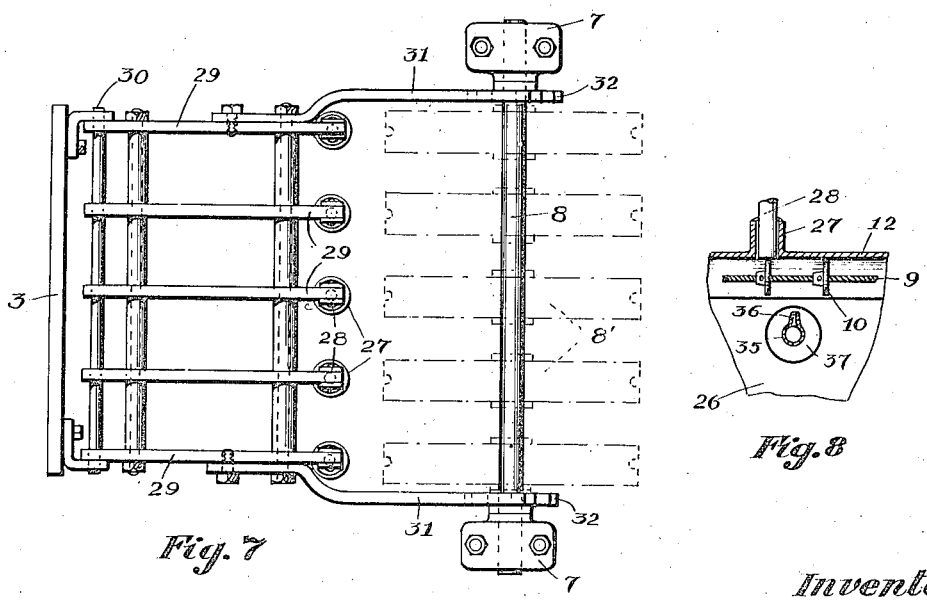

1,495,450

UNITED STATES PATENT OFFICE.

FRANK WENDELL SMITH, OF PORTLAND, MAINE.

COOKER.

Application filed June 4, 1923. Serial No. 643,277.

*To all whom it may concern:*

Be it known that I, FRANK WENDELL SMITH, a citizen of the United States, residing at Portland, in the county of Cumberland and State of Maine, have invented new and useful Improvements in Cookers, of which the following is a specification.

My invention relates principally to a method, new, as I believe, to the art of canning food products, in which are employed mechanisms for continuously moving the food to be cooked through food carriers entirely submerged in water heated to a high degree of temperature.

A system heretofore quite generally adopted by canners in the processing of food consists of first partially cooking it in bulk by the direct entrance of steam into its mass, then transferring it into marketing containers, and after sealing the latter, subjecting the sealed contents to a further heat treatment.

One of the primary objects of my invention is to get rid of this direct contact of the steam with the food, thereby preventing the ingress of foreign matter, such as scale from rusty pipes, oil or foul matter from the boiler; also eliminating the objectionable feature of mixing the condensed steam with the food, which greatly dilutes the syrup or juices and renders the product tasteless.

Another object is to subject the food to a slow and even degree of heat while cooking, and apply this heat in such a manner as not to destroy the natural form or shape of the article nor impair its flavor to any great extent.

A still further object which I have sought to attain is to make my cooker as sanitary as possible, and I have accomplished this by equipping it with proper cleansing and sterilizing devices which act on the parts coming into direct contact with the food.

Figure 1:
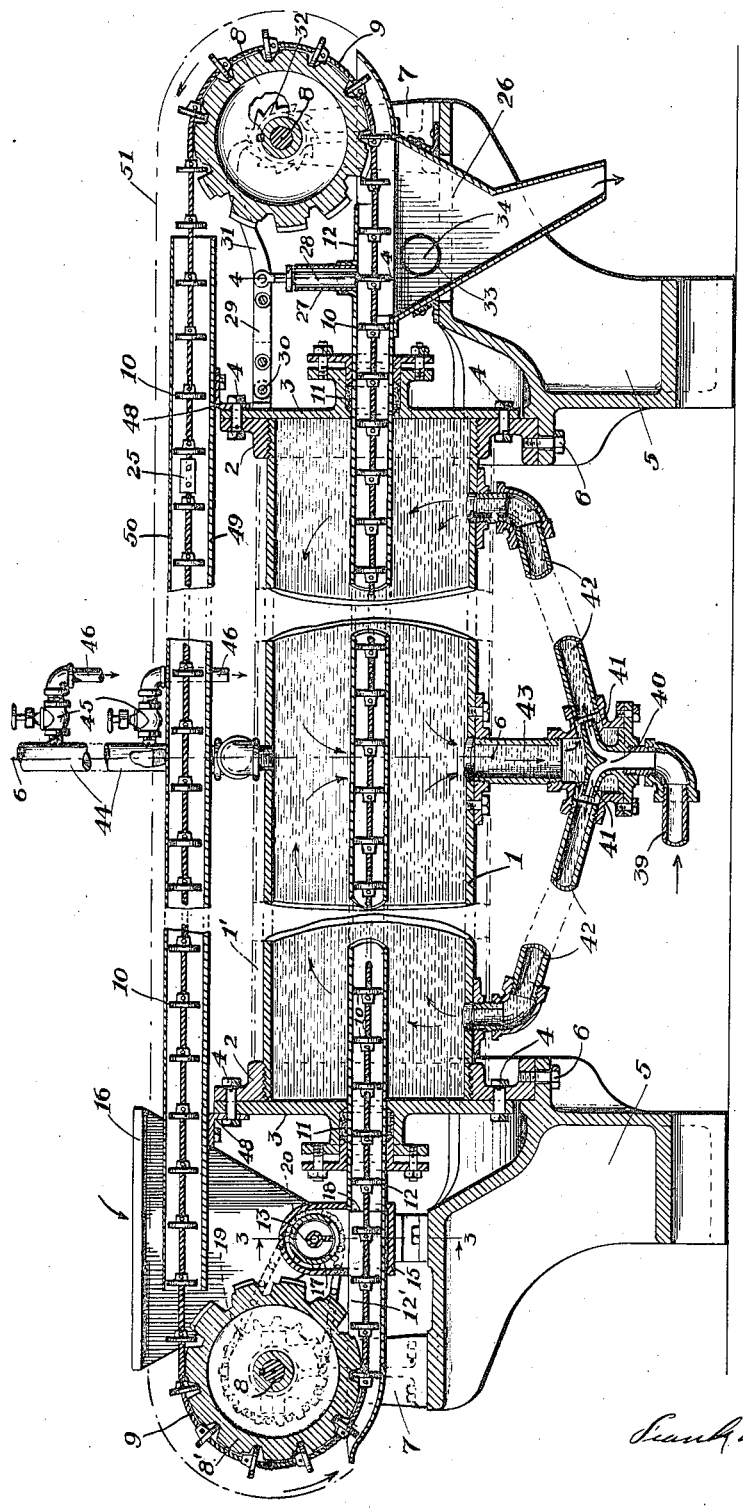
Figure 2:
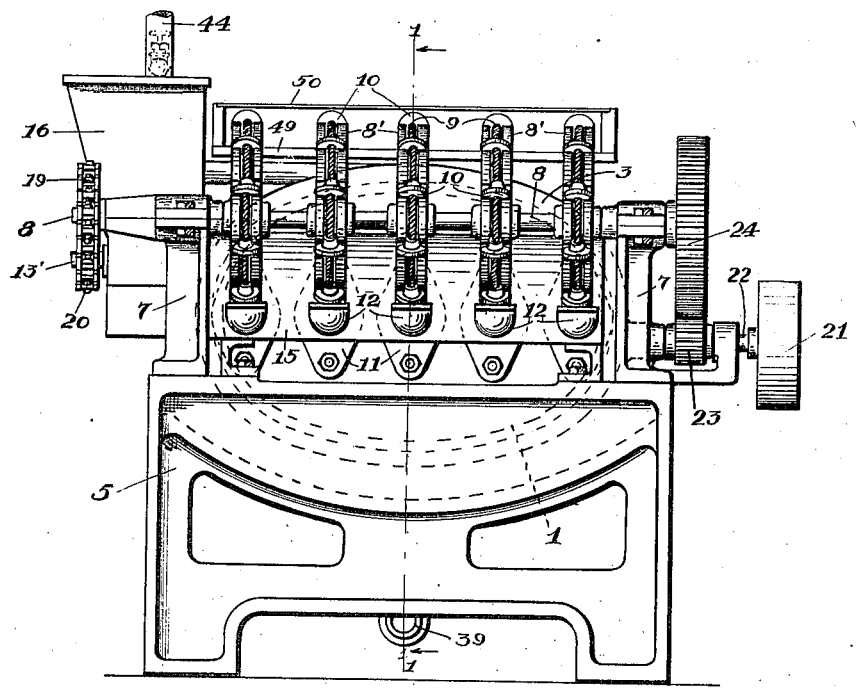
Figure 3:
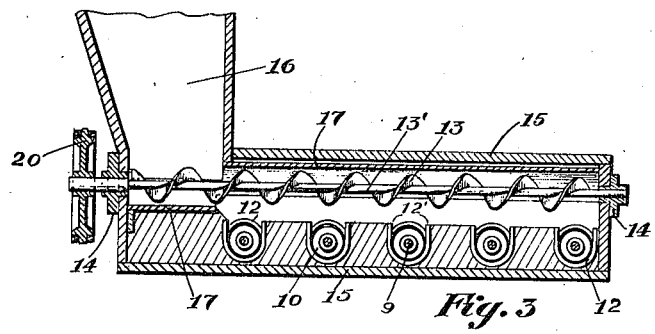
Figure 4:
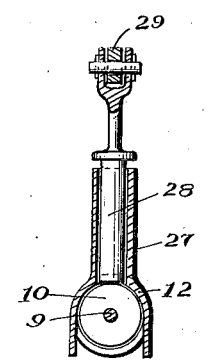
Figure 5:
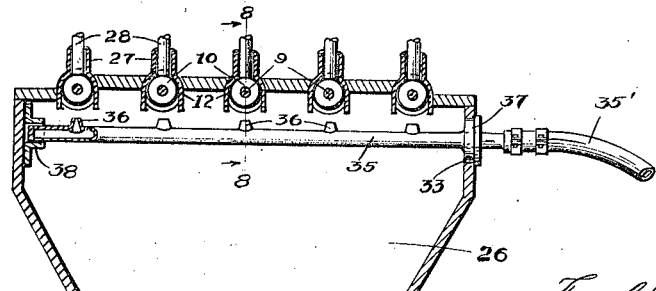

The method of operating my cooker will be described in detail in the following pages of my specification and its mechanical construction will be clearly visualized by referring to the drawings, in which Fig. 1 is a fragmentary longitudinal sectional elevation of the machine, taken on line 1—1, Fig. 2; Fig. 2 is an end elevation, looking from the filling end of the machine; Fig. 3 is a sectional elevation of the cross conveyor from the filling hopper, taken on line 3—3, Fig. 1; Fig. 4 is a sectional elevation through one of the vibrator units, section being taken on line 4—4, Fig. 1; Fig. 5 is a transverse sectional elevation through the vibrator, and also the conveyor tubes, showing the steam sterilizer in place, the section being taken on line 4—4, Fig. 1; Fig. 6 is a transverse sectional elevation through the heater drum and connecting parts, taken on line 6—6, Fig. 1; Fig. 7 is a plan view of the vibrator frame showing vibrator arms in contact with ratchet wheels, and Fig. 8 shows the sterilizer in place under the food conveyor, the section being taken on line 8—8, Fig. 5.

Similar numerals refer to similar parts throughout the several views of the drawings.

1 is a heater-drum, shown in oval form in cross section, although this shape may be round or square and serve the same purpose. 2, 2, are flanged rings, screw or otherwise secured to both ends of the drum; 3, 3 are drum heads secured to the flanged rings by bolts 4, 4. Supporting the whole structure are legs 5, 5, rigidly secured to the flanged rings by bolts 6, 6. Rotatably mounted in bearing stands 7, 7, on the outer portions of the legs 5, 5, are shafts 8, 8, upon which are fixed carrier-wheels 8', 8', the latter adapted to receive, and transmit movement to, the carrier or conveyor cables 9. Upon these cables (9) are attached at spaced intervals the discs 10, 10.

Extending through the entire length of the heater-drum 1, and through stuffing boxes 11, 11, are food carrying tubes 12, through which the food conveyors, consisting of the cables 9 and the discs 10, pass. The tubes may be more or less in number, depending wholly on whatever the requirements of the cooker, as to capacity, may be. Also mounted on one of the legs, 5, is a cross carrier 13, shown in the form of a screw, although any conventional type of carrier will serve the purpose equally as well. This screw carrier is mounted on a shaft 13' which rotates in bearings 14, 14,—the latter fixed in the housing 15. On one end of this housing, and outside of the line of food carrying tubes 12, is an in-feed hopper 16 which receives the product to be cooked. The food falls directly on to one end of the cross carrier, which when rotated forces the food forward within the cross carrier tube 17 and distributes it over the top of and into the food carrier tubes 12.

It will be noticed that these tubes (12), from the cross carrier outward, are split and their sides bent outward, as at 12', Fig. 3, so as to bring them into a U-shape form, to allow of the food being deposited within the tubes. To prevent the loss of any liquid in the food as it is being fed to them the tubes are extended and their ends bent upward,—forming a closed end trough. A joint in these tubes is made at 18 for the reason that the U-shaped end could not be assembled through the round stuffing boxes.

A sprocket wheel 19 is fixedly mounted on the shaft 8, and drives through a sprocket chain the sprocket wheel 20,—the latter fixedly mounted on the shaft 13' and is designed to transmit power to the cross carrier 13.

Any suitable motive power may be belted to the pulley 21, which is mounted on the shaft 22, as is also the pinion 23, and the latter will operate to drive the gear 24 which actuates the moving parts of the machine. The members forming the transmission part of the cooker may be placed direct connected to the shaft 8 on the in-feed end or shaft 8 on the out-feed end of the cooker, but I prefer to make the drive on the latter end. A suitable take-up device (not shown) for the cables may be provided by slotting the bolt holes in the base of the bearing standards and forcing the latter outward until the cables are sufficiently taut. Couplings for the cables are shown at 25.

On the out-feed end of the machine the food carrying tubes 12 have open bottoms for a distance equal to the width of the top opening in the collecting hopper 26. The sides of the tubes are split and bent outward, similar to the opposite ends on the in-feed, except that they form an inverted U-shape, as seen in Fig. 4. Attached to the upper sides of the tubes 12 in vertical alignment with the opening in the hopper 26 are vibrator guide tubes 27, loosely surrounding the vibrator plungers 28. The upper ends of the latter are bifurcated and pivotally connected to the vibrator frame 29. This frame is fulcrumed over the rod 30 (see Fig. 7) and has extending arms 31 with ends pointed and bent downwardly to contact with the teeth in the ratchet wheels 32. The bottoms of the vibrating plungers 28 are made to strongly impinge on the carrier discs 10 when the pointed ends of the arms 31 are in the spaces between the teeth of the ratchet wheels. When the shaft 8 (out-feed end) rotates, the ratchet wheel teeth raise the whole frame, including the plungers, and immediately the pointed ends of the arms fall off into the next space in the ratchet wheel a sudden jolt is given the discs 10. This is for the purpose of freeing the cable and discs of all food matter. The teeth in the ratchet operate synchronously with the discs,—the arms falling off the top of the ratchet teeth at the instant the disc comes vertically in line with the vibrator plunger.

By observing Figs. 5 and 8, my arrangement for cleaning and sterilizing the cable carrier will be understood. In one side of the hopper 26 is an opening 33 adapted to receive a plug 34 for the purpose of closing the orifice when the machine is operating as a cooker. Previous to cleaning, this plug is removed and the steam tube 35, having a multiplicity of spray nozzles 36 thereon, is inserted as in the position shown. A flanged collar 37 on the tube and a guide flange 38 on the opposite end of the hopper, hold the tube centrally in place, and the nozzles on the tube being spaced similarly to the center distances of the food carrying tubes, each unit in the carrier system will have its individual jet of steam acting on it.

After the steam is turned on to the cleaner the cables are made to move as when the machine is in the operation of cooking, and the steam jets, in conjunction with the vibrators will loosen and detach all food matter remaining on the carriers,—cleaning and sterilizing them at the same time. By transferring this steam jet cleaner to other parts of the machine, as for instance the carrier wheels, and operating it manually, the same result will obtain as with the carriers. Steam from any convenient source may be utilized for the cleaning operation, and a steam hose 35' serves as a simple connection to the cleaner.

In Figs. 1 and 6 my method of applying the heat to the food will be clearly seen. 39 is a steam inlet pipe from any steam generator. Passing up into a fitting 40 which has branch outlets 41, the steam is forced upward through the connecting pipes 42 into the bottom of the heater-drum 1, entering the latter on the bottom and near the ends. Opening downward from the central section of the drum, and connecting with the fitting 40, is a return pipe 43. The injection of the steam into the pipes 42 will create a current in the body of water in the drum, as indicated by the arrows, Fig. 1, the slightly cooler water being forced downward through the pipe 43 until it contacts with the steam jets in 41. The latter will force it again up through the pipes 42 and thus will continue a forced circulation so long as the steam jets are operated. Previous to running a quantity of food through the machine the water is raised to the required temperature. As temperature is to a certain extent controlled by pressure I have devised a simple method of raising the pressure in my heater, which will at the same time both raise the temperature and positively keep the heater-drum filled with water.

By observing Fig. 6 there will be seen a pipe 44 extending outwardly from the extreme top of the drum and then upwardly an indefinite distance. At spaced intervals on this vertical portion are openings from the pipe from which short branches are run, with valves 45 controlling each opening. Out from each valve is an overflow pipe 46 extending downwardly and emptying the overflow water into the funnel tube 47. By closing in succession these valves, beginning with the lowermost one and working upward I am able to obtain various pressures in the drum, limited only by the "head" of water in the vertical pipe. As the top of this pipe is open I require no safety valve, no pressure regulator and am always insured of a full drum of water,—an important consideration as I require the food carrying pipes to be always covered. The condensation of the heating steam will be taken care of by the overflow out of one of the valves 45.

I may choose to cover the outside of the heater-drum with some insulating material, 1', Fig. 1, which will help materially in raising and holding the temperature to a high point.

From the heads 3 I carry brackets 48 upward to support the drag plate 49 on which the slack side of the cables and discs move, and above at a distance sufficient to allow the discs to enter freely I place a cover 50, enclosing the carrier parts for the greater part of the length of the machine. I may further guard against contamination by enveloping the whole upper portion of the machine with a covering, as shown in dot and dash lines 51, Fig. 1.

The heater-drum is designed to be of sufficient length and the speed of travel of the food carrier such as to insure of proper cooking of the food between the time of its entrance into the food carrying tubes and its exit therefrom.

In operating the machine, the food in the raw state is dumped into the receiving hopper 16, fed across and into the open tops of the tubes 12, by the cross carrier, carried along by the cable carriers, and dropped by gravity into the collecting hopper 26 and thence into a filling machine,—the latter forming no part of my invention.

Having thus described my invention what I claim and wish to protect by Letters Patent is:

1. In a cooker, consisting of a cylindrical member; heads on each end of said member; tubes within and extending the entire length of said cylindrical member, and projecting through and beyond each of the said heads; means for forcing a continuous supply of raw food product through said tubes; means for keeping said cylindrical member completely filled with water; means for automatically holding the water in said cylindrical member at a constant and predetermined pressure, and means for heating the water in said cylindrical member, substantially as described.

2. In a cooker, consisting of a cylindrical member: heads closing both ends of said member; tubes within and extending the entire length of said cylindrical member and projecting through and beyond stuffing boxes in each of said heads; endless cable carriers with disc attachments secured thereto operating within said tubes; means for actuating said carriers; means for keeping said tubes supplied and filled with raw food product, whereby a continuous body of the latter may be carried through said tubes by said endless cable carriers; an opening in the top of said cylindrical member; an open-end pipe extending upwardly from said opening and designed to enclose a column of water outside of and in direct communication with the water in said cylindrical member, whereby said cylinder may at all times be completely filled with water; openings in said vertical pipe at spaced intervals in its length; connections equipped with valves extending out from said openings,—the closing or opening of said valves constituting means for sustaining the water level in said pipe at any predetermined height; a four-way fitting located beneath and centrally of the length of said cylindrical member, a pipe depending from said cylindrical member and connected to the top of said fitting; side openings in said fitting; pipes connecting said side openings with said cylindrical member on its under side and near its ends; steam nozzles projecting out from said fitting into the lower ends of said side pipes and means for admitting steam under pressure to said nozzles, whereby said water in said cylinder may be heated and a forced circulation of the same may be had, substantially as described.

3. In a cooker, consisting of a hollow drum; heads closing both ends of said drum; a multiplicity of tubes projecting beyond both of said heads and extending entirely through the length of said drum; means for sustaining the pressure of water in said drum at predetermined amounts by varying the head of a column of water in direct communication with the top portion of the water in said drum; means for heating said water in said drum comprising steam jets so placed that a forced circulation is produced; means for admitting raw food product into one end of said tubes; a conveyor adapted to force said food product through said tubes; means for collecting the expelled and cooked food product from the opposite ends of said tubes, and a vibrator, consisting of a multiplicity of plungers striking heavily and intermittently on certain portions of said conveyor at the food expelling point of its travel, substantially as described.

4. In a cooker, consisting of a cylindrical member; heads adapted to close both ends of said cylindrical member; means for keeping said cylindrical member completely filled with water while operating; means for heating said water by steam jets so placed in the system that a forced circulation of the water may be procured and a more even temperature throughout the cylindrical member attained; food carrying tubes projecting outside of both of said heads and extending through the entire length of said cylindrical member, the water in said latter member completely surrounding said tubes; means for conveying raw food product to one end of said tubes; means for conveying said food product through said tubes; means for expelling said food product subsequent to cooking, from said tubes and collecting the same in a common receptacle, and means for cleaning and sterilizing said conveyor parts,—said means consisting of a pipe with a multiplicity of steam nozzles opening out of same at spaced distances, and placed in contiguous relation to the said conveyor parts and operated while said conveyor is in motion, substantially as described.

FRANK WENDELL SMITH.